United States Patent [19]

Bunce et al.

[11] Patent Number: 4,938,271

[45] Date of Patent: Jul. 3, 1990

[54] DOSING APPARATUS

[75] Inventors: Kevin R. Bunce, Baldock; William Russell, Bury St. Edmunds, both of England

[73] Assignee: Elopak Systems AG, Glattbrugg, Switzerland

[21] Appl. No.: 158,249

[22] Filed: Feb. 19, 1988

[30] Foreign Application Priority Data

Feb. 20, 1987 [GB] United Kingdom ................. 8703985

[51] Int. Cl.$^5$ ............................. B65B 1/32; B65B 3/28
[52] U.S. Cl. ............................................ 141/1; 141/83;
141/258; 141/116; 92/98 D; 222/333; 222/63;
177/116
[58] Field of Search ..................... 141/83, 196; 222/55,
222/58, 63, 333, 77; 177/62, 64, 116, 98 R, 98 D

[56] References Cited

U.S. PATENT DOCUMENTS

| | | | |
|---|---|---|---|
| 2,712,408 | 7/1955 | Weber | 141/196 X |
| 2,763,416 | 9/1956 | Wormsr | 141/196 X |
| 3,648,741 | 3/1972 | Croasdale et al. | 141/196 X |
| 4,301,880 | 11/1981 | Krambrock et al. | 141/83 X |
| 4,381,545 | 4/1983 | Biddle, III et al. | 141/83 X |
| 4,437,498 | 3/1984 | Pankratz et al. | 141/258 X |
| 4,457,348 | 7/1984 | Mueller et al. | 141/196 X |
| 4,474,309 | 10/1984 | Solomon | 222/333 X |
| 4,565,304 | 1/1986 | Dronet | 222/333 X |
| 4,667,709 | 5/1987 | Fischer et al. | 141/258 X |
| 4,696,329 | 9/1987 | Izzi | 141/83 X |

*Primary Examiner*—Ernest G. Cusick
*Attorney, Agent, or Firm*—Pravel, Gambrell, Hewitt, Kimball & Krieger

[57] ABSTRACT

A dosing apparatus for packaging containers comprises a dosing device including a housing, a wall within the housing and reciprocable to draw in and expel a substance through an inlet and an outlet, respectively, of the housing, a rotary stepping motor which drives the wall, and a screw device which converts rotary motion of the motor to linear motion of the wall; and a control programmable to control the speed and stroke angle of the motor. The filled containers may be weighed in turn and the weight data used automatically to make any necessary corrections to the wall stroke.

17 Claims, 2 Drawing Sheets

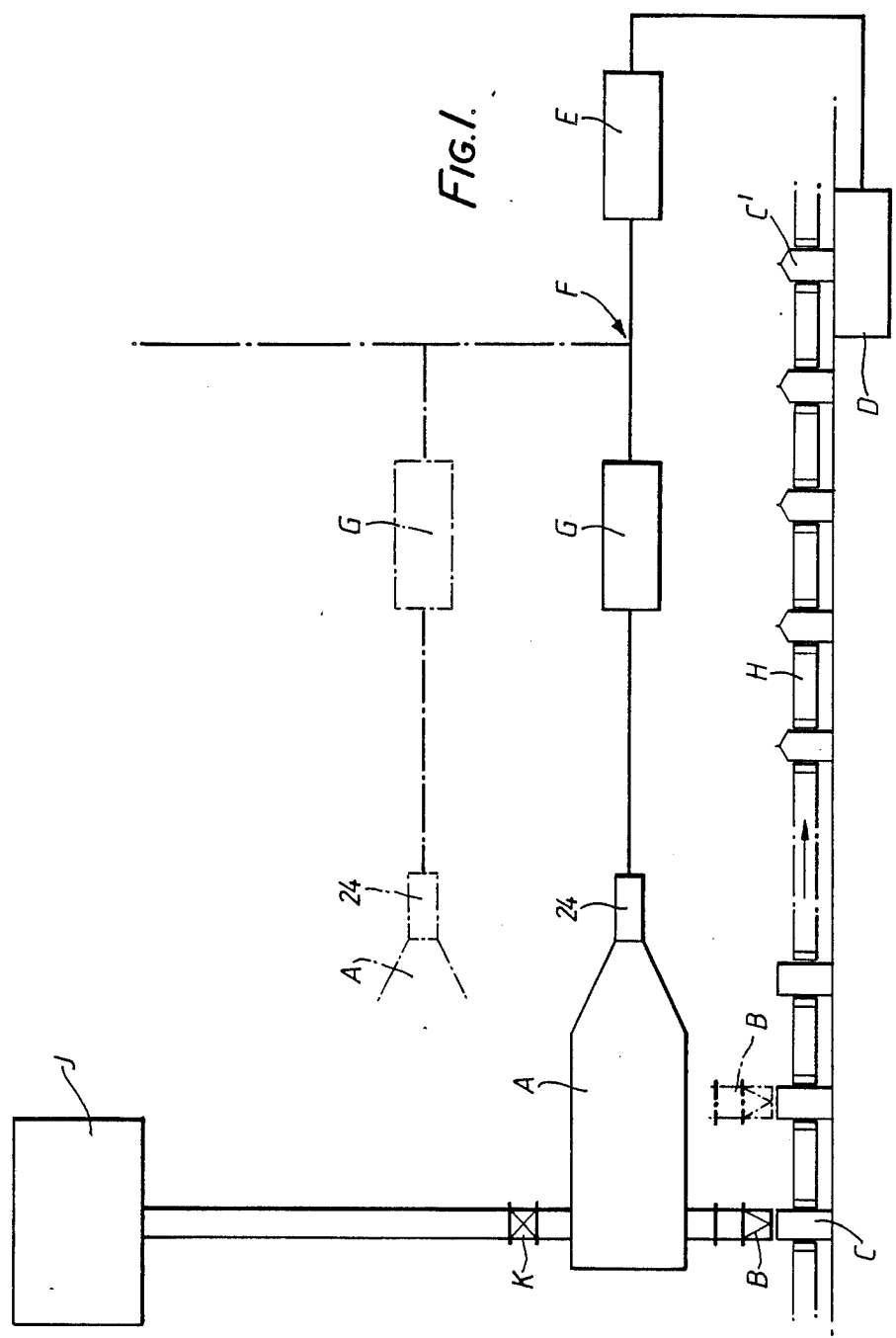

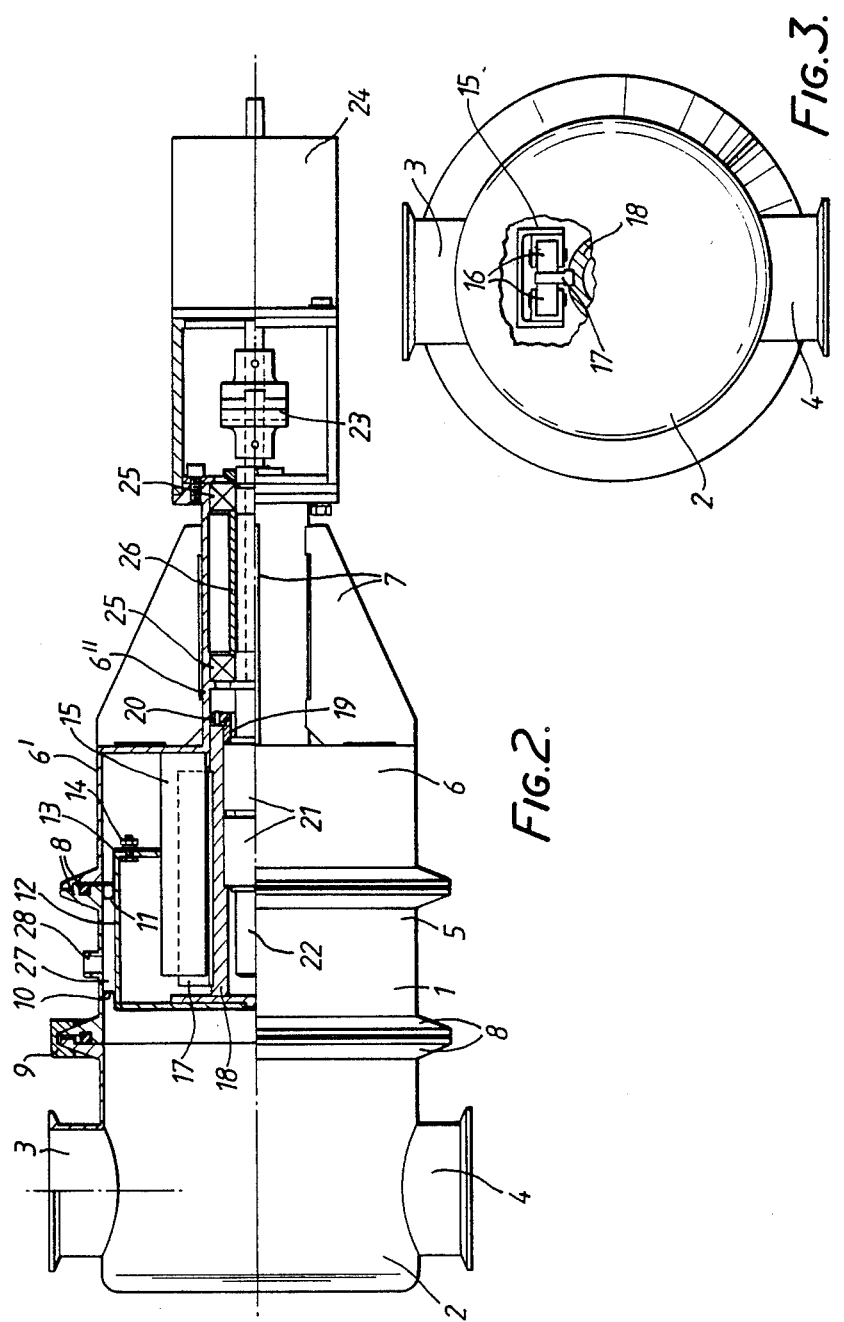

DOSING APPARATUS

BACKGROUND OF THE INVENTION

1. Field of the Invention

This invention relates to a dosing apparatus, especially for packaging containers.

2. Description of the Prior Art

Swiss Patent 627,552 discloses a dosing apparatus for separating analysis samples into sub-samples. The apparatus includes an easily interchangeable suction tip which, by way of a duct, is connected to a dosing chamber, in which a dosing plunger moves. The plunger is driven, by way of a screw spindle, by a stepping motor which is connected to a motor control connected to an input unit for presetting the volumes to be dosed each time. The sample to be sub-divided is first drawn up by means of the plunger into the suction tip and then, in accordance with volumes set by means of the unit, is delivered into sub-samples of equal or different sizes. The apparatus is so designed that the maximum volume which can be drawn up does not enter the duct. If desired, the motor control can be provided with an interface for a programmable electronic calculating apparatus, so that the dosing apparatus can work under programmed control, the input unit then being superfluous.

This apparatus is not suitable for use in the filling of packaging containers, since there is no provision for adaption to fluids of different viscosities, or for correction of incorrect dosing volume, and the apparatus has a combined inlet and outlet.

SUMMARY OF THE INVENTION

According to one aspect of the present invention, there is provided dosing apparatus, comprising a dosing device comprised of a housing having inlet and outlet means for a substance being dosed, a reciprocable wall in said housing reciprocable to obtain inflow and outflow of said substance through said inlet and outlet means, a rotary stepping motor for driving said wall, converting means interposed between said motor and said wall for converting rotary motion of said motor into linear motion of said wall, and programmable control means arranged to control said motor and thus the motion of said wall, wherein the improvement comprises said programmable control means being arranged to control the speed of said motor and thus the speed of said wall.

According to another aspect of the present invention, there is provided a method of dosing a substance, comprising operating oscillatorily a rotary stepping motor, and converting the motion thereby produced into reciprocatory linear motion of a wall in a housing to obtain inflow of said substance into and outflow of said substance from said housing and controlling said motor and thus said wall according to a computer programme, wherein the improvement comprises controlling the speed of said motor and thus the speed of said wall according to such programme.

The programmable control means advantageously controls both the magnitude and the rate of change of the speed of the motor and thus the wall.

According to a further aspect of the present invention, there is provided dosing apparatus, comprising a dosing device comprised of a housing having inlet and outlet means for a substance being dosed, a reciprocable wall in said housing reciprocable to obtain inflow and outflow of said substance through said inlet and outlet means, a rotary stepping motor for driving said wall, converting means interposed between said motor and said wall for converting rotary motion of said motor into linear motion of said wall, wherein the improvement comprises a weighing device connected to said control means for weighing containers filled by said dosing device and feeding weight data so obtained to said control means for the latter to use in controlling said motor.

Owing to the invention, it is possible to provide a dosing apparatus which not only has programmable control means but also is suitable for filling packaging containers.

BRIEF DESCRIPTION OF THE DRAWINGS

In order that the invention may be clearly understood and readily carried into effect, reference will now be made, by way of example, to the accompanying drawings, in which:

FIG. 1 shows a diagram of a dosing apparatus for filling containers with liquid, FIG. 2 shows a side elevation, partly in vertical, axial section, of a dosing device of the apparatus, and FIG. 3 shows an end view of the dosing device with parts broken away.

DESCRIPTION OF THE PREFERRED EMBODIMENTS

Referring to FIG. 1, the apparatus includes one or more dosing devices A which, through respective non-return nozzles B, fill open, gable-topped cartons C which are conveyed by a conveying device H through a top-sealing station to an electronic weighing scale D, where they arrive as sealed cartons C'. The scale D feeds weight data signals to a programmable logic controller E which through a multiplexed input/output F itself feeds instructions to one or more indexer units G which control individual stepping motors 24. The or each device A is supplied with liquid from a liquid reservoir J through respective non-return valves K. Each unit G is provided with a selection of programmes specifically designed to give efficient filling of respective liquids of differing viscosities.

Referring to FIGS. 2 and 3, the or each device A includes a housing 1 consisting of a cup-shaped casing 2 having an inlet 3 and an outlet 4 for a liquid being dosed, a tubular casing 5 and a casing 6 which is in the shape of a cup 6' with a central, outward, tubular extension 6". The parts 6' and 6" are stabilized by fins 7 attached thereto. At their adjacent ends, the casings 2 and 5 and the casings 5 and 6 are provided with respective flanges 8 fastened together by circular clamps (of which one is partially shown at 9) and have clamped between them respective rolling diaphragms 10 and 11. The diaphragm 10 is of a disc-like form with its central part attached to a cup-shaped member 12 which is co-axial with the housing 1. The diaphragm 11 is annular and has its inner peripheral edge clamped between the rim of the member 12 and an annular clamping member 13 attached by means of nut-and-bolt devices (of which one is seen and referenced 14) to the rim of the member 12. Fastened internally to the housing part 6' is a horizontal, inverted, U-shaped channel 15 in which are mounted vertical rollers 16 which guide movement of a vertical fin 17 extending in a vertical plane containing the axis of the housing 1. The fin 17 is fixed to a horizontal sleeve 18 fastened co-axially at one end to the base of the cup-shaped member 12. At its other axial end, the sleeve 18 is internally screwthreaded to receive an externally screw-threaded ring 19 constituting a backlash take-up device. The ring 19 is formed outside the sleeve 18 with a flange carrying grub screws (of which one is seen and referenced 20) tightenable against the adjacent axial end face of the sleeve 18 to prevent unintended unscrewing of the ring 19 from the sleeve 18. Clamped by the ring 19 against a shoulder in the sleeve 18 are two ball nuts 21 whereof the balls run in a helical groove in the surface of a horizontal rotary shaft 22 connected via a coupling 23 to a reversible rotary stepping motor 24. The shaft 22 rotates in ball bearings 25 between which is a spacer 26. The annular chamber 27 bounded by the casing 5, the diaphragms 10 and 11 and the member 12 communicates with a vacuum connection 28. The vacuum thereby produced in the chamber 27 serves to avoid incorrect folding of the diaphragms 10 and 11 as they are rolled to and fro.

In use of the apparatus, the motor 24 rotates the shaft 22 and thereby, through the ball nuts 21, produces horizontal movement of the sleeve 18 and thus the central part of the diaphragm 10, the rollers 16 serving to prevent rotation of the sleeve 18 about its horizontal axis. Rotation of the stepping motor 24 in the sense to produce outward movement of the member 12, i.e. movement of the member 12 in the direction away from the casing 2, draws in liquid through the non-return valve K and the inlet 3 to a volume determined by the extent of stepping movement of the motor 24. After the appropriate volume of liquid has been drawn in, the motor 24 is put in reverse and the member 12 driven inwards i.e. towards the casing 2, to expel the desired volume of liquid through the outlet 4 and the filling nozzle B.

The or each stepping motor 24 can be set on either full-step or half-step mode, the half-step mode giving 400 steps per revolution. The member 12 displaces approximately 0.25 grams per step. This displacement allows a 25 mm. stroke to displace 500 grams. Using the half-step mode means that the weights can be calibrated to within 0.25 of a gram.

When programming the or each unit G, the actual performance of the device A can be controlled by setting various speeds. This means that different products to be filled can each have an individual control programme specifically designed for the efficient filling of that product.

The or each unit G is designed to change from a base programme to a different movement programme, on acceptance of different input conditions.

Using this arrangement, the controller E can control the movement programmes required for the different weights of fill simply by weighing samples.

In the embodiment shown in FIG. 1, the cartons are all conveyed in turn to the scale D and the average weight of a selected number of them is used to control the angular stroke of the motor 24 and thus the linear stroke of the member 12. In an alternative version, cartons selected at intervals can be carried to the scale and then the cartons weighed in turn and the average weight automatically fed to the controller E.

The dosing apparatus can fill a single line of cartons or a plurality of lines of cartons. In a multi-line arrangement, a line number would be entered on the scales, then selected cartons would be weighed in turn. After each carton has been weighed an enter key would be pressed. On completion of a batch of the cartons, the average weight would be sent to the controller E and the appropriate unit G would be adjusted automatically.

Various activities in the apparatus can be constantly monitored and information can be printed out for a true recording of the events. This is a further protection against light weights arriving in the market place.

Among the advantages of the apparatus described above with reference to the drawing are its dosing accuracy, its capacity for fine adjustment of the dosage and its capacity for a rapid variation of the dosage. All of these are attainable owing to the use of the computer-controlled stepping motor. Automatic adjustment of the dosage is particularly advantageous since it enables a batch weighing machine to weigh a sample batch of filled containers and to feed the weight data into the computer, which gives automatic correction of any error.

Moreover, having the dosing apparatus drive independent of the machine drive in a container-filling machine enables the dosing apparatus to be run independently of the machine for cleaning the dosing apparatus in situ.

The dosing apparatus described is also particularly applicable to aseptic filling.

The programme control of the present apparatus facilitates matching the displacement and speed of the member 12 to the capacity of, say, the filling machine, and/or to the viscosity of the liquid. It can also achieve a very simple way of preventing dripping as filling stops, by producing a very short and fast outward movement of the member 12 as filling ceases, in order to draw the liquid back slightly at the outlet of the filling nozzle.

We claim:

1. An improved method of filling containers with a substance, comprising advancing containers one after another past a dosing station, operating oscillatorily a rotary stepping motor constituting a dosing drive, and converting the motion thereby produced into reciprocatory linear motion of a wall in a housing to obtain inflow of a dosage of said substance into and outflow of said dosage from said housing to supply discrete dosages to said containers at said dosing device, and controlling according to a computer programme the speed of said motor and thus the speed of said wall and thereby speed of flow of said dosage.

2. A method according to claim 1, wherein said controlling comprises controlling the magnitude and the rate of change of the speed of said motor.

3. A method according to claim 1, wherein said operating is preceded by programming an indexer, which indexes said motor, with a range of programmes designed for efficient dosing of a range of substances to be dosed, and selecting a programme from said range of programmes.

4. A method according to claim 1, wherein the dosed containers are weighed and weight data so obtained are used to control the magnitude of the oscillation of said motor and thereby the stroke of said wall and thus the volume of said dosage.

5. A method according to claim 4, wherein the dosed containers are automatically conveyed to a weighing station at which they are weighed.

6. A method according to claim 1, wherein the speed of said motor and thus said wall are controlled to produce a very short and fast return movement of said wall as it completes its filling stroke.

7. A container-filling machine, including a dosing device, and conveying means arranged to advance containers one after another past said dosing device at which said containers are supplied with discrete dosages of a substance, said dosing device comprising a housing having inlet and outlet means for said substance being dosed, a reciprocable wall in said housing reciprocable to obtain inflow and outflow of said substance through said inlet and outlet means, a rotary stepping motor constituting a dosing drive for reciprocating said wall to obtain inflow of a dosage of said substance and an outflow of said dosage through said inlet and outlet means, converting means interposed between said motor and said wall for converting rotary motion of said motor into linear motion of said wall, and programmable control means arranged to control said motor and thus the motion of said wall, said programmable control means being arranged to control the speed of said motor and thus the speed of said wall.

8. A container-filling machine according to claim 7, wherein said programmable control means is arranged to control the magnitude and the rate of change of the speed of said motor.

9. A container-filling machine according to claim 7, wherein said programmable control means comprises a programmable controller and a programmable indexer whereby said programmable controller controls said motor, said indexer being programmable to store a range of programmes designed for efficient dosing of a range of substances to be dosed, and said controller being able to select a programme from said range of programmes.

10. A container-filling machine according to claim 8, and further comprising a second dosing device substantially identical to the first-mentioned dosing device, said programmable control means including a second programmable indexer substantially identical to the first-mentioned programmable indexer and whereby said programmable control means controls said second dosing device, and multiplex means interposed between the controller and the indexers, whereby the controller controls the indexers.

11. A container-filling machine according to claim 7, and further comprising a weighing device connected to said control means for weighing containers filled by said dosing device and feeding weight data so obtained to said control means for the latter to use in controlling said motor to adjust the stroke of said wall and thus the volume of said dosage.

12. A container-filling machine according to claim 11, wherein said conveying means conveys containers from said dosing device to said weighing device.

13. A container-filling machine according to claim 7, wherein said inlet and outlet means is an inlet and an outlet and wherein said outlet is spaced from said inlet.

14. A container-filling machine according to claim 7, wherein said control means is arranged also to control said motor to adjust the stroke of said wall and thus the volume of said dosage.

15. A container-filling machine according to claim 7, wherein said converting means comprises an externally-threaded shaft and a member cooperating with the external threading of said shaft.

16. An improved dosing apparatus, comprising a dosing device comprising of a housing having inlet and outlet means for a substance being dosed, a reciprocable wall in said housing reciprocable to obtain inflow and outflow of said substance through said inlet and outlet means, a rotary stepping motor constituting a dosing drive for reciprocating said wall to obtain an inflow of a dosage of said substance and an outflow of said dosage through said inlet and outlet means, control means for controlling said motor, converting means interposed between said motor and said wall for converting rotary motion of said motor into linear motion of said wall, wherein the improvement comprises a weighing device connected to said control means for weighing containers filled by said dosing device and feeding weight data so obtained to said control means for said control means to use in controlling said motor to adjust the stroke of said wall and thus the volume of said dosage.

17. An improved dosing apparatus, comprising a dosing device comprised of a housing having inlet and outlet means for a substance being dosed, a reciprocable wall in said housing reciprocable to obtain inflow and outflow of said substance through said inlet and outlet means, a rotary stepping motor constituting a dosing drive for reciprocating said wall to obtain inflow of a dosage of said substance and an outflow of said dosage through said inlet and outlet means, converting means interposed between said motor and said wall for converting rotary motion of said motor into linear motion of said wall, programmable control means arranged to control said motor and thus the motion of said wall, said programmable control means being arranged to control the speed of said motor and thus the speed of said wall, first and second diaphragms each connected to said wall and to said housing and whereby said wall is sealingly connected to said housing, and said diaphragms, with said wall and said housing, define an annular chamber encircling said wall, and suction means connected to said chamber for producing vacuum therein.

* * * * *